United States Patent Office 3,555,086
Patented Jan. 12, 1971

3,555,086
HERBICIDAL N-OCTAHYDRO-1,2,4-METHENO-
PENTALENYL-(5)-UREAS
Claus Dieter Weis, Arlesheim, Basel-Land, and Jürg
Rumpf, Binningen, Basel-Land, Switzerland, assignors
to Geigy Chemical Corporation, Ardsley, N.Y., a corporation of New York
No Drawing. Filed Dec. 18, 1967, Ser. No. 691,200
Claims priority, application Switzerland, Dec. 22, 1966,
18,376/66
Int. Cl. C07c 127/00
U.S. Cl. 260—553                                     5 Claims

ABSTRACT OF THE DISCLOSURE

Herbicidal compounds of the formula

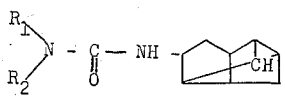

in which $R_1$ represents hydrogen, lower aliphatic hydrocarbons, cycloalkyl, lower alkoxy, or phenyl,
$R_2$ represents hydrogen, lower alkyl, or lower alkenyl, or
$R_1$ and $R_2$ together represent ethyleneoxyethylene or a polymethylene bridging member.

are described as particularly suitable for controlling weeds and undesirable grasses. Compositions containing these compounds as active ingredients in mixture with agriculturally acceptable carriers and a method of controlling weeds and undesirable grasses with the aid of such compounds or compositions containing them are also described, as well as intermediates which are methenopentalene derivatives from which the compounds of the above formula can be produced.

The present invention concerns new ureas, processes for the production thereof and new methenopentalene derivatives serving as starting materials therefor, herbicidal compositions which contain the new ureas as active ingredients, and a method for controlling undesirable plant growth with the aid of the new ureas or compositions containing the same as active ingredients.

It has been found that new urea derivatives of the formula

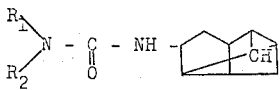

(I)

wherein $R_1$ represents hydrogen, a lower aliphatic hydrocarbon radical, a cycloalkyl radical, a lower alkoxy radical or the phenyl radical,
$R_2$ represents hydrogen, a lower alkyl or a lower alkenyl radical, or
$R_1$ and $R_2$ together represent the ethylenoxyethylene radical or a polymethylene bridging member, have excellent herbicidal properties and are valuable for controlling weeds and undesirable grasses. The active substances can be used in the pre-emergence as well as in the post-emergence treatment for the control of undesirable plant growth in cultivated crops. They are distinguished in particular by their quick onset of action as well as short-time residual effects.

In the urea derivatives of general Formula I, $R_1$, as lower aliphatic hydrocarbon radical, can represent a lower alkyl radical having 1 to 5 carbon atoms such as the methyl, ethyl, propyl, butyl or amyl radicals, etc., a lower alkenyl radical such as the allyl or methallyl radical, or it can be an alkinyl radical such as the propinyl or 1-methyl-2-propinyl radical; as cycloalkyl radical, it has preferably from 3 to 8 carbon atoms and can, for instance, be a cyclopropyl, cyclobutyl, cyclopentyl, cyclohexyl or cyclooctyl radical; as alkoxy radical it can be, e.g., the methoxy, ethoxy, propoxy or butoxy radicals. As lower alkyl radical, the symbol $R_2$ can be one of those radicals mentioned above for $R_1$. The polymethylene bridging member symbolised by $R_1$ and $R_2$ together has from 3 to 6 chain members and is, e.g., the trimethylene, tetramethylene, pentamethylene or hexamethylene group.

The new ureas of Formula I are obtained by reacting a functional derivative of octahydro-1,2,4-methenopentalenyl-(5)-carbamic acid with an amine of general Formula II

(II)

wherein $R_1$ and $R_2$ have the meanings given in Formula I, in the presence of a solvent which is inert to the reaction components.

According to another analogous process, the ureas of general Formula I are obtained by reacting octahydro-1,2,4-methenopentalenyl-(5)-amine with either:

(a) A carbamic acid halide of the general Formula III

(III)

wherein

Hal represents halogen up to the atomic number 35,
$R_1$ represents hydrogen, a lower aliphatic hydrocarbon radical, a cycloalkyl radical, a lower alkoxy radical or the phenyl radical,
$R_2$ represents hydrogen or a lower alkyl radical, or
$R_1$ and $R_2$ together represent the ethyleneoxyethylene radical or a polymethylene bridging member, or (b) The components for the formation of such a carbamic acid halide of Formula III, i.e., with phosgene and an amine of Formula II, in the presence of a condensing agent, and, preferably, in a solvent or diluent which is inert to the reaction components.

The octahydro-pentalenyl-(5)-ureas of the general Formula I wherein $R_1$ is a lower aliphatic hydrocarbon radical, a cycloalkyl radical or the phenyl radical and $R_2$ is hydrogen, are also obtained according to the invention by reacting octahydro-1,2,4-methenopentalenyl - (5) - amine with an isocyanate of the general Formula IV

$R_1$—NCO                                             (IV)

wherein $R_1$ represents a lower aliphatic hydrocarbon radical, a cycloalkyl radical or the phenyl radical.

Reactive functional derivatives of the carbamic acid mentioned are, for example, the following: the isocyanate, the lower alkyl esters, particularly the methyl or ethyl ester, also the phenyl ester, as well as mono- and disubstituted amides.

The new ureas of the general Formula I wherein $R_1$ is a lower alkoxy radical, can be produced by subsequent alkylation, in the presence of an acid binding agent, of an N - octahydro - 1,2,4 - methenopentalenyl-(5)-N'-alkoxy urea or of an N-octahydro-1,2,4-methenopentalenyl-(5)-N'-hydroxy urea with the usual alkylating agents such as alkyl halides, dialkyl sulphates, etc. The N-octahydro- 1,2,4-methenopentalenyl-(5)-N'-alkoxy ureas can be obtained in their turn by reaction of the octahydro-1,2,4-methenopentalenyl-(5)-isocyanate with an O-alkyl hydroxylamino [O. Scherer et al., Angnew. Chemie, 75, 851–854 (1963)].

Examples of inert solvents suitable for the modifications mentioned of the process according to the invention are hydrocarbons such as benzene, toluene, xylenes; ethers such as diethyl ether, dioxane, tetrahydrofuran, diethylene glycol monomethyl ether; chlorinated hydrocarbons such as methylene chloride, and low ketones such as acetone or methylethyl ketone.

The reaction of the isocyanate, of a carbamic acid ester or amide (urea) is generally performed without condensing agent. In some cases it can be of advantage to perform the reaction in the presence of, e.g., alkali metal alcoholates or a tertiary organic base.

The reaction of octahydro-1,2,4-methenopentalenyl-(5)-amine with a carbamoyl halide or components for the formation of same (phosgene/amine of Formula II) is performed in the presence of a condensing agent such as an inorganic base, e.g., alkali metal hydroxide or acetate, hydrogen carbonate, carbonate and phosphate, or in the presence of an organic base, e.g., a tertiary amine such as pyridine, trialkylamine or collidine. Amines of the general Formula II which are useful are, e.g., the following: methylamine, dimethylamine, ethylamine, diethylamine, the propylamines and the butylamines, cyclopropylamine, cyclobutylamine, cyclopentylamine, cyclohexylamine, also aniline, acetidine, pyrrolidine, piperidine and morpholine. These amines can be used in the reaction both in the free form and also as salts of hydrohalic acids, preferably as hydrochlorides.

As isocyanates of general Formula IV, the corresponding alkyl isocyanates can be used such as the methyl, ethyl and propyl isocyanates, phenyl isocyanate, the allyl isocyanate, also the cyclopropyl, cyclobutyl, and cyclohexyl isocyanate. As carbamic acid halides of Formula III, particularly the dialkyl and alkylaryl carbamic acid chlorides and bromides such as dimethyl, diethyl, di-isopropyl, cyclopropyl, cyclobutyl, cyclopentyl, cyclohexyl and methylphenyl carbamic acid chloride, can be reacted according to the present invention.

Both octahydro-1,2,4-methenopentalenyl-(5)-isocyanate and octahydro-1,2,4-methenopentalenyl-(5)-amine have not been known hitherto. These compounds, which serve as intermediate products, are obtained by degrading functional reactive derivatives of octahydro-1,2,4-methenopentalenyl-(5)-carboxylic acid. The azide and amide can be used as reactive functional derivatives which are degraded according to Curtius or Hofmann to the isocyanate and amine respectively.

The starting isocyanate is produced, preferably, by Curtius degradation of the azide. For this purpose, either the carboxylic acid chloride which is then reacted with alkali metal azide to form the desired carboxylic acid azide; or one of the alkyl esters such the methyl or ethyl ester is converted into the carboxylic acid azide direct with hydrazine hydrate and nitrous acid, preferably in the presence of a solvent or diluent. The azide is converted into the isocyanate by thermic decomposition in a solvent which is inert to the reaction components such as in an aromatic hydrocarbon such as benzene, toluene, xylenes, or in a higher boiling ether such as dioxane. The temperature for the decomposition of the azide lies between 20 and 180° C.

The isocyanate is converted into the octahydro-1,2,4-methenopentalenyl-(5)-amine by reacting it either with (a) glacial acetic acid and acetic acid anhydride, or (b) with an alkanol. In the former case (a), the acetylamine is obtained as reaction product which is converted into the free amine by alkaline saponification. In case (b), the carbamic acid esters corresponding to the alkanols used are obtained which can be converted by acid as well as basic hydrolysis into the amine mentioned. Hydrohalic acids, glacial acetic acid, halogenated acetic acids or mixtures of such acids, e.g., can be used for acid hydrolysis; alkali metal and alkaline earth metal hydroxides, for example, are suitable for basic hydrolysis. The hydrolysis can be performed both in water as well as in an alkanol such as methanol and ethanol or in diethylene glycol, etc.

In addition, octahydro-1,2,4-methenopentalenyl-(5)-amine can be obtained by acid amide degradation according to Holmann. For this purpose, the corresponding carboxylic acid amide is heated, e.g., in the presence of an agent giving off bromine or chlorine, the presence of an alkali metal or alkaline earth metal hydroxide or an acid. Both water as well as an alkanol are suitable as solvent, but in cases where the degradation is performed in an alkanol, e.g., methanol or ethanol the corresponding alcoholates are used instead of the hydroxides mentioned.

The new ureas of the general Formula I, in the purified state, are colourless and dissolve well in organic solvents; on the other hand, they are insoluble in water.

Compounds according to the invention are particularly useful in the selective control of weeds and other undesirable plant growth in cultivated crops. The amounts required per hectare range from about 0.25 to preferably not more than 5 kg.

For instance, $N^1$ - dimethyl - $N^2$ - [octahydro - 1,2,4-methenopentalenyl-(5)]-urea is particularly recommended for use in the post-emergence weed control in corn or bean crops. Pastinaca, rye grass and vetch are destroyed, when the herbicide is applied in concentrations of about 0.5 to 3 kg. per hectare, while the corn or beans remain practically unaffected.

$N^1$ - diethyl - $N^2$ - [octahydro-1,2,4-methenopentalenyl-(5)]-urea is an excellent herbicide for the selective control of weeds and grasses, e.g., rye grass, in beans, millet, corn, flax and sunflower crops.

When applied in pre-emergence treatment, about 0.5 to 3 kg. per hectare of this compound are adequate for weed control, while in post-emergence treatments larger amounts of up to 5 kg. per hectare may be required depending on the climatic and soil conditions and on the crop to be protected.

Good weed control was also achieved against dicotyle weeds in pre-emergence tests in summer wheat and sugar beet fields and in post-emergence tests in summer wheat, as well as against such weeds as *Apera spica* and *Matricaria* in winter wheat.

$N^1$ - methoxy-$N^1$-methyl-$N^2$-[octahydro-1,2,4-methenopentalenyl-(5)]-urea is particularly suited for controlling undesirable growth of grasses of all kinds in corn and sunflower crops and, in post-emergence treatment, also in millet.

Particularly good herbicidal activity of this compound was found in tests in summer wheat, rye and barley crops when applying the compound in amounts of from about 0.25 to preferably not more than 1 kg. per hectare, especially in a post-emergence treatment.

Particularly preferred because of very satisfactory herbicidal activity are those compounds of Formula I in which $R_1$ represents hydrogen, alkyl of from 1 to 5 carbon atoms, alkenyl of from 3 to 4 carbon atoms, alkinyl of from 3 to 4 carbon atoms, cycloalkyl of from 3 to 6 carbon atoms, alkoxy of from 1 to 4 carbon atoms, or phenyl;

$R_2$ represents hydrgen, alkyl of from 1 to 5 carbon atoms or alkenyl of from 3 to 4 carbon atoms, or $R_1$ and $R_2$ together with the nitrogen atom to which they are linked represent an acetidino, pyrrolidino, piperidino, hexahydroazepino or morpholino group.

Those compounds of Formula I in which both $R_1$ and $R_2$ represent hydrogen, or one represents hydrogen and the other methyl, or both represent methyl, or both ethyl, or both together represent tetramethylene, or pentamethylene, or ethylene-oxy-ethylene, or $R_2$ represents methyl and $R_1$ either 1'-methyl-2'-propinyl or methoxy have proven particularly valuable in the control of weeds and undesirable grasses.

Parts and percentages mentioned in this specification and in the appended claims are given by weight unless expressly stated otherwise.

Concentrations of active ingredient in solid mixtures are given in percent of the total weight of the mixture, and in substantially liquid preparations they are given by percent weight of active substance per total volume of the preparations. The relationship of parts by weight to parts by volume is that of kilograms to liters.

The following nonlimitative examples illustrate the invention further. The temperatures are given therein in degrees centigrade.

EXAMPLE 1

(1) Production of the starting material (a) 164 parts of the known octahydro-1,2,4-methenopentalenyl-(5)-carboxylic acid [cf. H. K. Hall, J. Org. Chem. 25, 42 (1960)], 1000 parts by volume of benzene and 4 parts by volume of pyridine are gently heated on a steam bath. 250 parts of thionyl chloride are added dropwise within 15 minutes in such a way that the reaction proceeds by itself with $SO_2$ development. On completion of the addition of the thionyl chloride, the whole is heated for another 15 minutes on the steam bath, after which all volatile products are removed at room temperature by water jet vacuum. 200 parts by volume of petroleum ether are added to the residue, the mixture is left to stand for 30 minutes and then filtered. The solvent is removed in the evaporator. The octahydro-1,2,4-methenopentalenyl-(5)-carboxylic acid chloride obtained is distilled; it boils at 63–65°/2 torr. (Yield: 162.7 parts; 88.5%.)

(b) 93.6 parts of sodium azide are dissolved in 1720 parts by volume of 50% aqueous acetone and the solution is cooled to 0°. 90 parts of the octahydro-1,2,4-methenopentalenyl-(5)-carboxylic acid chloride obtained according to (a) are then added within 5–10 minutes. The temperature in the reaction vessel is kept at 0–2° by exterior cooling. On completion of the addition, the whole is stirred at 0° for another 50 minutes, after which the solution is extracted, first with 1000 parts by volume of ice cold benzene and then a second time with 300 parts by volume of ice cold benzene. The combined benzene extracts are then dried with finely pulverised calcium chloride at 0–5°. The calcium chloride is filtered off and the filtrate is heated for 2½ hours in a steam bath. Nitrogen is developed and the solution foams. The benzene is then distilled off. The octahydro-1,2,4-methenopentalenyl-(5)-isocyanate boils at 70–75°/3 torr.

(2) Production of a urea derivative according to the invention (c) 16.1 parts of octahydro-1,2,4-methenopentalenyl-(5)-isocyanate (cf. Example 1(b)) in 200 parts by volume of benzene are reacted with 9.7 parts of diethylamine. After removal of the solvent, the crude product is distilled: B.P. 131–134°/0.004 torr. After recrystallisation from petroleum ether, N-octahydro-1,2,4-methenopentalenyl-(5)-N',N'-diethyl urea is obtained as colourless crystals.

EXAMPLE 2

(a) 16.1 parts of octahydro-1,2,4-methenopentalenyl-(5)-isocyanate (cf. Example 1(b)) are boiled for 100 minutes in a mixture of 25 parts by volume of glacial acetic acid and 15 parts by volume of acetic acid anhydride. On completion of the $CO_2$ development, 35 parts by volume of the solvent are distilled off and the residue is poured into 100 parts by volume of water and then stirred for 3 hours. The precipitated crystalline product is taken up in 175 parts by volume of ether, the ethereal solution is washed with 15 parts by volume of water and dried with sodium sulphate. After removal of the ether, the residue is distilled. The octahydro-1,2,4-methenopentalenyl-(5)-acetylamine obtained boils at 120–125°/0.05 torr, and melts at 77–80°.

(b) 26.5 parts of the acetyl amine obtained above are boiled in a solution of 200 parts by volume of diethylene glycol monomethyl ether and 42 parts of potassium hydroxide in 50 parts by volume of water. 35 parts by volume of water are slowly distilled off and the mixture is then refluxed for 8 hours (inner temperature 120°). The mixture is poured into 600 parts by volume of water and the solution is extracted 5 times with 80 parts by volume of ether each time. The combined ether extracts are washed twice with 20 parts by volume of saturated sodium chloride solution each time and then dried over sodium sulphate. After removal of the ether, 18.3 parts of the oily amine are obtained by distillation at 82–84°/12 torr. As the distillate still contains diethylene glycol monomethyl ether, it is purified as follows: 221 parts of crude amine are dissolved in 1500 parts by volume of dry ether and hydrogen chloride is introduced into the solution at 0° until no more hydrochloride precipitates. The octahydro - 1,2,4 - methenopentalenyl - (5) - amine hydrochloride so isolated is washed with ether and dried in vacuo. It melts at 265–270°.

(c) 117 parts of the above amine hydrochloride are dissolved in 100 parts by volume of water and the solution is shaken with 200 parts by volume of 4 N sodium hydroxide solution. The precipitated amine is extracted 4 times with 150 parts by volume of ether each time and the ethereal solution is dried with sodium sulphate. After removal of the ether and distillation, the amine is obtained as a colourless liquid. The octahydro-1,2,4-methenopentalenyl-(5)-amine boils at 81–83°/12 torr $n_D^{20}$: 1.5160.

(d) 6.45 parts of dimethyl carbamic acid chloride are added dropwise to a solution of 8.1 parts of octahydro-1,2,4-methenopentalenyl-(5)-amine and 6.3 parts of triethylamine in 80 parts by volume of benzene, the addition being made at a temperature of 5–10°. The reaction mixture is then stirred for another 2 hours at 25°. The precipitated triethylamine hydrochloride is filtered off and the solution is washed with water. After drying, the benzene is removed in a rotary evaporator. The octahydro - 1,2,4 - methenopentalenyl - (5) - N',N' - dimethyl urea obtained is sublimed at 150°/1 torr and melts at 138–140°.

EXAMPLE 3

16.1 parts of octahydro-1,2,4-methenopentalenyl-(5)-isocyanate (cf. Example 1(b)) are dissolved in 200 parts by volume of benzene and 7 parts of methoxy-methylamine are added dropwise within 12 minutes in such a way that the temperature does not rise above 5°. The whole is stirred for 20 minutes at 25° and then the solvent is removed in vacuo. The residue is distilled and an oil, boiling at 112–114°/0.07 torr, is obtained which slowly solidifies. The N-octahydro-1,2,4-methenopentalenyl-(5)-N'-methyl-N'-methoxy urea melts at 73–76°.

EXAMPLE 4

8.05 parts of octahydro-1,2,4-methenopentalenyl-(5)-isocyanate (cf. Example 1(b)) are dissolved in 50 parts by volume of tetrahydrofuran and ammonia is introduced into this solution while stirring. The reaction mixture is stirred at room temperature for another 45 minutes and then the solvent is evaporated in vacuo. The N-octahydro-1,2,4 - methenopentalenyl - (5)-urea which remains melts at 135–140°.

EXAMPLE 5

13.5 parts of octahydro - 1,2,4-methenopentalenyl-(5) amine are dissolved in 200 parts of benzene and the solution is added dropwise within 30 minutes to 11.8 parts of phenyl isocyanate in 100 parts of benzene, the addition being made at 20–30° while cooling with an ice bath. The reaction mixture is then stirred for 16 hours at 50–60° whereupon it is filtered and the residue is recrystallised from ethyl acetate. The N-octahydro-1,2,4-methenopentalenyl-(5)-N'-phenyl urea obtained melts at 181–182°.

EXAMPLE 6

Example 1 is repeated but in lieu of the octahydro-1,2,4 - methenopentalenyl - (5) - carboxylic acid produced as described by Hall, supra, there is used the same acid produced by saponification from its ethyl ester, obtained by the process of Schrauzer et al. [Chem. Berichte 97, 2451 (1964)].

For this purpose, 288 g. of ethyl octahydro-1,2,4-methenopentalenyl-(5)-carboxylate are dissolved in a mixture of 75 g. of sodium hydroxide, 850 ml. of water and 250 ml. of ethanol, and the whole is boiled under reflux for 6 hours. The solution is then concentrated to a volume of 600 ml., and acidified with 250 ml. of concentrated hydrochloric acid. An oil layer forms which is separated from the aqueous phase and then mixed with 500 ml. of diethyl ether. The aqueous phase is extracted twice with with each time 100 ml. of diethyl ether. The combined ether solutions are then washed with water and dried over anhydrous sodium sulfate. The ether solvent is then evaporated and the residue distilled under vacuum. The fraction boiling at 103–105° under 0.3 torr is the free octahydro-1,2,4-methenopentalenyl-(5)-carboxylic acid. It is obtained in an amount of 199.1 g. (82% yield rate).

When using this acid as starting material in Example 1 and otherwise repeating the entire procedure of that example, there is obtained N-octahydro - 1,2,4-methenopentalenyl-(5)-N',N'-diethyl urea (melting point 88–89°), having the excellent herbicidal properties described hereinbefore.

Besides the already mentioned ureas those listed in the following table are similarly useful and are also obtained by the process described in Examples 1 and 6 when equivalent amounts of the corresponding starting materials are used:

heated in a steam bath for 45 minutes. Acetic acid is then added until the mixture is neutral and all volatile products are removed by evaporation. The residue is shaken with 100 parts by volume of water. The water is decanted. 250 parts by volume of petroleum ether are added to the insoluble residue, the whole is left to stand for some hours and then filtered. The filtrate is concentrated, and the oily residue is distilled. It boils at 97–101°/0.02 torr. The octahydro-1,2,4-methenopentalenyl-(5)-carbamic acid methyl ester crystallises and, after recrystallisation from petroleum ether, melts at 84–86°.

29 parts of this carbamic acid methyl ester and 42 parts of potassium hydroxide are boiled in 50 parts by volume of water and 200 parts by volume of diethylene glycol monomethyl ether as solvent. 35 parts by volume of water are slowly distilled off; the solution finally boils at 125°. It is then boiled for 8 hours. The mixture is poured into 600 parts by volume of water and the solution is extracted 5 times with 80 parts by volume of ether each time. The ether extracts are combined and washed twice with 20 parts by volume of saturated sodium chloride solution each time and then dried over sodium sulphate. After removal of the ether, distillation at 82–84°/12 torr yields 18.3 parts of oily amine. This amine still contains diethylene glycol monomethyl ether as impurity and is purified by way of the hydrochloride as described in Example 2(b) and 2(c). It is then further reacted as described in step (d) of Example 2, and N-octahydro-1,2,4-methenopentalenyl-(5)-N',N'-dimethyl urea of the herbicidal properties described hereinbefore is obtained.

The herbicidal compositions according to the invention are produced in the known way by intimately mixing and milling active substances of general Formula I with suitable carriers, optionally with the addition of dispersing agents or solvents which are inert to the active substances. The active substances can be present and used in dusts, sprinkling agents, granulates, coated granules, impregnated

| Ex. No. | Compound | M.P. or B.P., ° C. |
|---|---|---|
| 7 | N-octahydro-1,2,4-methenopentalenyl-(5)-N'-isobutyl urea | 164–166 |
| 8 | N-octahydro-1,2,4-methenopentalenyl-(5)-N'-n-amyl urea | 96–98 |
| 9 | N-octahydro-1,2,4-methenopentalenyl-(5)-N'-allyl urea | 78–80 |
| 10 | N-octahydro-1,2,4-methenopentalenyl-(5)-N'-methoxy urea | [1] 148–150 |
| 11 | N-octahydro-1,2,4-methenopentalenyl-(5)-N'-cyclooctyl urea | 190–192 |
| 12 | N-octahydro-1,2,4-methenopentalenyl-(5)-N', N'-diallyl urea | 75–77 |
| 13 | N-octahydro-1,2,4-methenopentalenyl-(5)-N'-cyclopropyl urea | 51–54 |
| 14 | N-octahydro-1,2,4-methenopentalenyl-(5)-N'-cyclobutyl urea | |
| 15 | N-octahydro-1,2,4-methenopentalenyl-(5)-N'-cyclopentyl urea | |
| 16 | N-octahydro-1,2,4-methenopentalenyl-(5)-N'-cyclohexyl urea | 220–223 |
| 17 | N-octahydro-1,2,4-methenopentalenyl-(5)-urea | 140–145 |
| 18 | N-octahydro-1,2,4-methenopentalenyl-(5)-N'-methyl urea | 116–118 |
| 19 | N-octahydro-1,2,4-methenopentalenyl-(5)-N', N'-dimethyl urea | 128–130 |
| 20 | N-octahydro-1,2,4-methenopentalenyl-(5)-N'-tetramethylene urea | 169–170 |
| 21 | N-octahydro-1,2,4-methenopentalenyl-(5)-N', N'-diethyl urea | 86–88 |
| 22 | N-octahydro-1,2,4-methenopentalenyl-(5)-N'-pentamethylene urea | 166–168 |
| 23 | N-octahydro-1,2,4-methenopentalenyl-(5)-N'-ethyleneoxyethylene urea. | 173–175 |
| 24 | N-octahydro-1,2,4-methenopentalenyl-(5)-N'-methyl-N'-(1'-methyl-2'-propinyl)-urea. | 105–107 |
| 25 | N-octahydro-1,2,4-methenopentalenyl-(5)-N'-methyl-N'-methoxy urea. | [2] 109–112 |

[1] 0.04 torr.  [2] 0.06 torr.

EXAMPLE 26

10 parts of octahydro - 1,2,4 - methenopentalenyl-(5)-carboxylic acid ethyl ester, 40 parts by volume of a 26% by volume aqueous ammonia solution and 5 parts by volume of methanol are heated in an autoclave for 10 hours at 140°. Volatile parts are removed from the reaction product by water jet vacuum. 25 parts by volume of the acetone are added to the residue, the mixture is filtered and the residue is recrystallised from water. The octahydro-1,2,4-methenopentalenyl-(5) - carboxylic acid amide obtained melts at 160–169° (with decomposition).

16.3 parts of octahydro-1,2,4-methenopentalenyl-(5)-carboxylic acid amide are dissolved in 500 parts by volume of methanol. 11 parts of sodium methylate are then added and the whole is left to stand for 30 minutes and then granules, homogeneous granules; wettable powders, pastes, emulsions; solutions and aerosols.

The concentration of active substance in these compositions is, e.g., 0.01 to 80%.

Other biocidal active substances or agents can be admixed with the compositions according to the invention. Thus, the new compositions, in addition to the compounds mentioned of general Formula I can contain, e.g., insecticides, other herbicides, fungicides, bactericides, fungistatica, bacteriostatica or nematocides, to widen the range of action.

As herbicides can be mentioned, for instance, halogendiamino, alkoxy-diamino- and alkylthio-diamino-s-triazines, in particular, 2-chloro-4-methylamino-6-isopropylamino-s-triazine, 2 - chloro-4,6-diethylamino-s-triazine, 2-chloro - 4 - ethylamino - 6 - isopropylamino-s-triazine, 2- chloro - 4,6 - diisopropylamino-s-triazine, 2-chloro-4-ethyl-amino-6-diethylamino-s-triazine, 2 - chloro-4,6-bis-diethyl-amino-s-triazine, 2-chloro - 4 - diethylamino-6-isopropyl-amino-s-triazine, 2 - chloro-4-ethylamino-6-(3'-methoxy-propylamino-s-triazine, 2-methoxy- and 2-methylthio-4-methylamino-6-isopropylamino-s-triazine, 2-methoxy- and 2-methylthio-4,6-diethylamino-s-triazine, 2-methoxy- and 2-methylthio-4-ethylamino-6-isopropylamino-s-triazine, 2-methoxy- and 2-methylthio - 4,6 - diisopropylamino-s-triazine, 2-methylthio-4-isopropylamino-6-(3'-methoxy-propylamino)-s-triazine, 2-methoxy - 4,6 - bis-(3'-methoxypropylamino)-s-triazine and 2-methylthio - 4,6 - bis-(3'-methoxypropylamino)-s-triazine.

The compositions according to the invention can also contain synthetic fertilisers and trace elements.

The following examples serve to illustrate the application part of the present invention; where not otherwise stated, parts mean parts by weight.

WETTABLE POWDER

The following components are used to product a 50% wettable powder:

50 parts of octahydro-1,2,4-methenopentalenyl-(5)-N',N'-dimethyl urea,
5 parts of dibutylphenyl/ethylene oxide condensate,
5 parts of a naphthalene sulphonic acid/phenol sulphonic acid/formaldehyde condensation product,
40 parts of Champagen chalk.

The active substances mentioned are drawn onto the carriers and then mixed and milled with the additives given. Wettable powders having excellent wettability and suspendibility are obtained. Suspensions of any concentration desired can be obtained from such wettable powders by dilution with water.

GRANULATE 90 parts of a granular carrier, e.g., sand, kaolin, montmorillonite, are moistened with 1.5 parts of water, isopropanol or polyethylene glycol and mixed with 10 parts of N-octahydro - 1,2,4 - methenopentalenyl-(5)-N'-methyl urea.

These compositions are applied preferably in such amounts that at least about 0.5 kg., but not more than 5 kg. of active ingredient are applied per hectare of area in which the growth of weeds and undesirable grasses is to be controlled.

We claim:
1. A compound of the formula

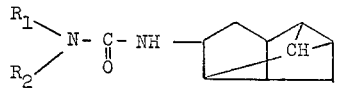

wherein $R_1$ represents hydrogen, alkyl of from 1 to 5 carbon atoms, alkenyl of 3 or 4 carbon atoms, alkynyl of 3 or 4 carbon atoms, cycloalkyl of from 3 to 8 carbon atoms, or phenyl, and $R_2$ represents hydrogen, alkyl of from 1 to 4 carbon atoms, or alkenyl of 3 or 4 carbon atoms.

2. A compound as defined in claim 1, which is N-octahydro-1,2,4-methenopentalenyl-(5)-N'-methyl urea.

3. A compound as defined in claim 1, which is N-octahydro-1,2,4-methenopentalenyl-(5)-N',N'-dimethyl urea.

4. A compound as defined in claim 1, which is N-octahydro-1,2,4-methenopentalenyl-(5)-N',N'-diethyl urea.

5. A compound as defined in claim 1, which is N-octahydro-1,2,4-methenopentalenyl - (5) - N'-(1'-methyl-2'-propinyl)-N'-methyl urea.

References Cited

UNITED STATES PATENTS

| | | | |
|---|---|---|---|
| 3,163,674 | 12/1964 | Buntin | 260—553 |
| 3,174,843 | 3/1965 | Buntin et al. | 260—533X |
| 3,276,855 | 10/1966 | Richter | 260—453X |
| 3,304,167 | 2/1967 | Buntin et al. | 260—553X |
| 3,332,975 | 7/1967 | Bauer et al. | 260—453 |
| 3,347,658 | 10/1967 | Luckenbaugh | 260—553X |
| 3,365,289 | 1/1968 | Raff et al. | 260—553X |
| 3,395,233 | 7/1968 | Duerr et al. | 260—453X |

FOREIGN PATENTS

| | | | |
|---|---|---|---|
| 1,479,858 | 3/1967 | France | 260—553 |
| 1,481,308 | 4/1967 | France | 260—553 |
| 1,086,527 | 10/1967 | Great Britain | 260—553 |

BERNARD HELFIN, Primary Examiner

M. W. GLYNN, Assistant Examiner

U.S. Cl. X.R.

260—453, 326.3, 247.2, 294; 71—119, 120, 88, 94, 95; 260—500.5